(12) United States Patent
Paumier

(10) Patent No.: US 7,743,803 B2
(45) Date of Patent: Jun. 29, 2010

(54) STUMP GRINDING WHEEL

(75) Inventor: James J. Paumier, Canton, OH (US)

(73) Assignee: New River Equipment Corp., North Canton, OH (US)

( * ) Notice: Subject to any disclaimer, the term of this patent is extended or adjusted under 35 U.S.C. 154(b) by 104 days.

(21) Appl. No.: 12/061,143

(22) Filed: Apr. 2, 2008

(65) Prior Publication Data
US 2008/0245440 A1 Oct. 9, 2008

Related U.S. Application Data

(60) Provisional application No. 60/909,760, filed on Apr. 3, 2007.

(51) Int. Cl.
*B27C 1/00* (2006.01)
*A01G 23/06* (2006.01)

(52) U.S. Cl. .................. 144/24.12; 144/235; 299/102; 241/294; 241/296

(58) Field of Classification Search .................. 144/218, 144/234, 241, 24.12, 235; 299/78, 102; 37/301, 37/302; 407/33, 34, 36, 53; 241/294
See application file for complete search history.

(56) References Cited

U.S. PATENT DOCUMENTS

| | | | |
|---|---|---|---|
| 1,953,297 A | 4/1934 | Good | |
| 6,138,725 A * | 10/2000 | Leonardi et al. | ............ 144/235 |
| 6,382,277 B1 | 5/2002 | Paumier et al. | |
| 6,546,977 B1 | 4/2003 | Monyak et al. | |
| 6,848,485 B1 | 2/2005 | Paumier et al. | |
| 7,100,651 B1 | 9/2006 | Monyak et al. | |
| 7,299,836 B2 * | 11/2007 | Green | ..................... 144/24.12 |
| 2004/0182477 A1 | 9/2004 | Kopocs et al. | |
| 2004/0244869 A1 | 12/2004 | Schafer | |

* cited by examiner

*Primary Examiner*—Shelley Self
(74) *Attorney, Agent, or Firm*—Krugliak, Wilkins, Griffiths & Dougherty Co., L.P.A.; David P. Dureska; Edward T. Kennedy

(57) ABSTRACT

A stump grinding wheel includes a wheel disc, which includes multiple recesses formed about its periphery. A peripheral cutter assembly is disposed in each one of the recesses and is mounted on the wheel disc. Multiple side cutter assemblies are mounted on the wheel disc, and each one includes a first pocket and a second pocket. The first pocket is disposed on one side of the wheel disc and the second pocket is disposed on the other side of the wheel disc, and a wear pad is formed adjacent a selected end of each pocket. A cutting tooth is received in aligned openings formed in the first pocket, the wheel disc, and the second pocket. A nut threadably engages the cutting tooth of the side cutter assembly to secure the tooth to the first and second pockets, and to secure the pockets to the wheel disc.

16 Claims, 11 Drawing Sheets

STUMP GRINDING WHEEL

CROSS-REFERENCE TO RELATED APPLICATION

This application claims the benefit of U.S. Provisional Patent Application Ser. No. 60/909,760, which was filed on Apr. 3, 2007.

BACKGROUND OF THE INVENTION

1. Technical Field

The present invention relates to the art of grinding tree stumps and other materials. More particularly, the invention relates to the art of wheels that are used to grind tree stumps and other materials. Still more particularly, the invention relates to wheels for grinding tree stumps and other materials that provide improved installation, positioning and orientation of cutting tools which are mounted on the wheel, thereby improving the performance and the life of the wheels.

2. Background Art

In order to remove tree stumps and other similar materials from the ground during construction or other work, a stump grinder is typically used. The stump grinder usually includes a driven wheel, which is known as a stump grinding wheel, and specialized cutting tools are mounted on the sides and on the outer periphery of the wheel. When it is desired to remove a stump, the stump grinder is activated, thereby turning or rotating the wheel, and the cutting tools that are mounted on the wheel are brought into contact with the stump. As the wheel rotates, the cutting tools gradually cut and disintegrate the stump, thus removing the stump from the ground.

In the prior art, some particularly effective stump grinders have included cutting tools that have become known in the art as side cutter assemblies. A side cutter assembly typically includes pairs of cutting teeth, in which the teeth of each pair extend through the wheel in opposing directions. More particularly, one tooth of a pair of teeth extends through the wheel so its respective cutting tip protrudes through one side of the wheel, and the other tooth of the pair extends through the wheel so its respective cutting tooth protrudes through the other side of the wheel. Each pair of teeth seats in a pair of mechanical pockets, each one of which is disposed on an opposing side of the wheel. A nut is threaded onto each tooth to securely clamp the teeth to the pockets, and in turn to clamp the pockets to the wheel. In the prior art, about twenty or more side cutter assemblies are mounted on the wheel in helical patterns to maximize cutting efficiency, and each side cutter assembly is mounted on the wheel in a generally circumferentially-extending orientation.

To increase the cutting ability of the stump grinding wheel, some side cutter assemblies have been modified to form peripheral cutter assemblies, which enable cutting teeth to be placed about and to extend from the peripheral edge of the wheel. This is typically accomplished by forming radial slots in the periphery of the wheel and securing the teeth in specialized mechanical pockets, which seat in the radial slots and typically are secured to the wheel by welding. These peripheral cutter assemblies are significant, since they typically make the initial contact with the stump, and also accomplish a significant amount of grinding due to the fact that they are mounted on the fastest-moving part of the wheel, that is, on the periphery of the wheel.

During use of the stump grinder, the fast-moving nature of the peripheral edge of the wheel subjects the wheel periphery and the peripheral cutter assemblies to extreme wear from abrasive materials that are trapped between the rotating wheel and the uncut portion of the stump. While the prior art helical mounting patterns of the circumferentially-extending side cutter assemblies create an excellent cutting pattern, they leave large areas of the periphery of the wheel unprotected, and thus vulnerable to such extreme wear. This wear undesirably shortens the life of the wheel. As a result, there is a need in the art for a stump grinding system that uses a pocket with a new shape, which enables improved positioning, placement and orientation of the side cutter assemblies to protect the peripheral areas of the wheel and thus extend the life of the wheel.

A second disadvantage of prior art stump grinding wheels is the congested location of certain side cutter assembly pockets with respect to other side cutter assembly pockets and to the peripheral cutter assembly pockets. More particularly, in order to optimize the amount of cutting performed by the wheel, side cutter assemblies are mounted in the above-mentioned helical patterns, which extend outwardly to the periphery of the wheel. Some side cutter assemblies may be mounted in close proximity to one another, and such close proximity of circumferentially-oriented assemblies may cause them to interfere with one another and create congested areas. In addition, certain side cutter assemblies are mounted along the periphery of the wheel between the peripheral cutter assemblies in a circumferentially-oriented manner, and the close proximity of the side cutter assemblies with the peripheral cutter assemblies may cause them to interfere with the welds that secure the peripheral cutter assemblies to the wheel, thereby creating additional congested areas. These congested areas may pack with dirt and pieces of the stump, which may in turn cause the wheel to undesirably become unbalanced. An unbalanced wheel often generates severe vibration and thus requires replacement, resulting in increased cost and lost production. As a result, there is a need in the art for a stump grinding wheel having improved positioning, placement and orientation of side cutter assemblies to reduce the potential for creating congested areas along the periphery of the wheel.

A third disadvantage of prior art stump grinding wheels is misalignment of the cutting teeth, which may be created by mounting side cutter assemblies in a circumferentially-oriented manner. More particularly, with prior art stump grinding wheels, the cutting edges of the teeth on one side of a wheel typically are properly aligned to cut a stump, but the teeth on the opposite side of the wheel may not be properly aligned. As described above, a pair of teeth extends through the wheel, with each tooth of the pair extending in opposite directions, and the pair of teeth seats in a pair of mechanical pockets, each one of which is disposed on an opposing side of the wheel. Each tooth includes a cutting edge, which is typically a carbide edge, and optimally is aligned at a desired angle for easy cutting of a stump. This desired cutting angle is measured radially from the center of the wheel.

The circumferential mounting orientation of the side cutter assemblies often impedes uniform alignment of the cutting edges of the teeth, so that the cutting edges on one side of the wheel are undesirably disposed at different angles when compared to the cutting edges on the other side of the wheel. As a result, the cutting edges on one side of the wheel may be uniformly aligned, while the cutting edges on the other side of wheel are not, causing a considerable difference in cutting performance when using the cutting edges on one side of the wheel as compared to using the cutting edges on the other side of the wheel. For example, an operator of a stump grinder using a wheel with such cutting tools may experience smooth cutting when advancing the wheel into the stump one way, which uses the cutting edges on one side of the wheel that are properly aligned. However, when the operator advances the wheel into the stump from the opposite direction, which uses the cutting edges on the other side of the wheel that are not properly aligned, the wheel may bounce, vibrate and/or cut poorly. Such bouncing and vibration can cause damage to the stump grinding machine and lost production. Therefore, there is a need in the art for a stump grinding wheel that provides improved uniform alignment of the edges of the cutting teeth to enable optimum cutting by cutting edges on both sides of the wheel.

A fourth disadvantage of prior art stump grinding wheels is shifting of the alignment of the teeth when they are tightened down. More particularly, each tooth of each side cutter assembly typically includes a square section that seats in a corresponding square recess in its respective mechanical pocket. When the tooth is inserted into the pocket and tightened down with a nut, the square section of the tooth rotates slightly until a wall or corner of the square section meets and seats against a corresponding wall or corner of the recess in the pocket. As described above, the alignment of the cutting edge of each tooth is important. Such slight turning of the tooth in the pocket may cause the cutting edge of the tooth to undesirably turn, resulting in the cutting edges of the teeth on one side of the wheel being at different angles from the cutting edges of the teeth on the other side of the wheel, as measured radially from the center of the wheel. This contributes to the above-described problem of the cutting edges of the teeth cutting well when the operator advances the wheel into the stump one way, but then cutting poorly when the operator advances the wheel into the stump from the opposite direction. As a result, there is a need in the art for a stump grinding wheel that enables the cutting teeth to maintain proper alignment as they are tightened down.

A fifth disadvantage of stump grinding wheels of the prior art is that, while the combination of side cutter assemblies and peripheral cutter assemblies on a wheel works well on large powerful machines, such an aggressive combination of cutter assemblies may cause the wheel to hang up or stall on smaller machines. More particularly, the use of side cutter assemblies and peripheral cutter assemblies, which grab and dig into the stump as they cut, requires a significant amount of power in order to keep the wheel rotating. Since smaller stump grinding machines generate less power than larger machines, the smaller machines may not have enough power to keep the wheel moving as the aggressive combination of side cutter and peripheral cutter assemblies grabs and digs into the stump. In addition, sometimes a wheel having an aggressive combination of side cutter assemblies and peripheral cutter assemblies will move up or climb up on the stump that is being cut, which can upset or overturn a smaller stump grinding machine, potentially damaging the machine. Thus, there is a need in the art for a stump grinding wheel that provides for the optional use of a less aggressive combination of cutting assemblies when a smaller stump grinding machine is employed, while retaining the robustness of the cutting assemblies that are used on larger machines.

As a result, a need exists in the art for a stump grinding wheel that reduces or minimizes the above-described disadvantages. The stump grinding wheel of the present invention satisfies this need.

SUMMARY OF THE INVENTION

An objective of the present invention is to provide a stump grinding wheel in which the design of the pockets of the side cutter assemblies enables improved positioning, placement and/or orientation of the side cutter assemblies, thereby protecting from wear the peripheral areas of the wheel, the pockets of the peripheral cutter assemblies and the welds that secure the pockets of the peripheral cutter assemblies, while maintaining optimum cutting performance.

Another objective of the present invention is to provide a stump grinding wheel in which the design of the pockets of the side cutter assemblies limits interference of the side cutter assemblies with one another and with the welds of the peripheral cutter assemblies, thereby reducing the possibility of clogging the wheel with roots and dirt.

Yet another objective of the present invention is to provide a stump grinding wheel that includes pockets for the side cutter assemblies which can be mounted in an orientation that ensures the cutting edges of the teeth are generally at equal angles on each side of the wheel.

Still another objective of the present invention is to provide a stump grinding wheel that includes pockets for the side cutter assemblies that are mounted in an orientation which enables a manufacturer to optionally adjust the angle of the side cutter assemblies to achieve a more forward angle, known to those skilled in the art as a positive rake, to allow the side cutter assemblies to cut more aggressively using larger stump grinding machines, or to achieve a more backward angle, known to those skilled in the art as a negative rake, to allow the side cutter assemblies to cut less aggressively using smaller stump grinding machines.

Yet another objective of the present invention is to provide a stump grinding wheel in which the pockets of the side cutter assemblies include features that enable the end of the pockets to extend to various heights above the peripheral edge of the wheel, thereby enabling an operator to gauge the depth of cut for the teeth of the peripheral cutter assemblies.

Still another objective of the present invention is to provide a stump grinding wheel in which the depth of the cut that the side cutter assemblies will take from a stump is controllable.

Yet another objective of the present invention is to provide a stump grinding wheel in which the side cutter pockets and the cutting teeth that are mounted in the side cutter pockets include features that maintain the alignment of the teeth as they are tightened down.

These objectives and others are obtained by the stump grinding wheel of the present invention. In an exemplary embodiment of the invention, the stump grinding wheel includes a wheel disc which includes a first side, a second side opposing the first side, and an outer periphery extending between and interconnecting the sides. A plurality of recesses are formed in a periphery of the wheel disc, and a peripheral cutter assembly is disposed in each one of the recesses and is mounted on the wheel disc. A plurality of side cutter assemblies is also mounted on the wheel disk. Each one of the side cutter assemblies includes a first pocket and a second pocket. The first pocket is disposed on one of the first and second sides of the wheel disc and the second pocket is disposed on the other of the first and second sides of the wheel disc. Each one of the pockets is formed with a wear pad adjacent a selected end of the pocket. A cutting tooth received in aligned openings that are formed in the first pocket, the wheel disc, and the second pocket. A nut threadably engages the cutting tooth, and upon tightening of the nut, the tooth is secured to the first and second pockets, and the pockets are secured to the wheel disc.

BRIEF DESCRIPTION OF THE DRAWINGS

The preferred embodiments of the present invention, illustrative of the best mode in which applicant has contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENTS

Figure 1:
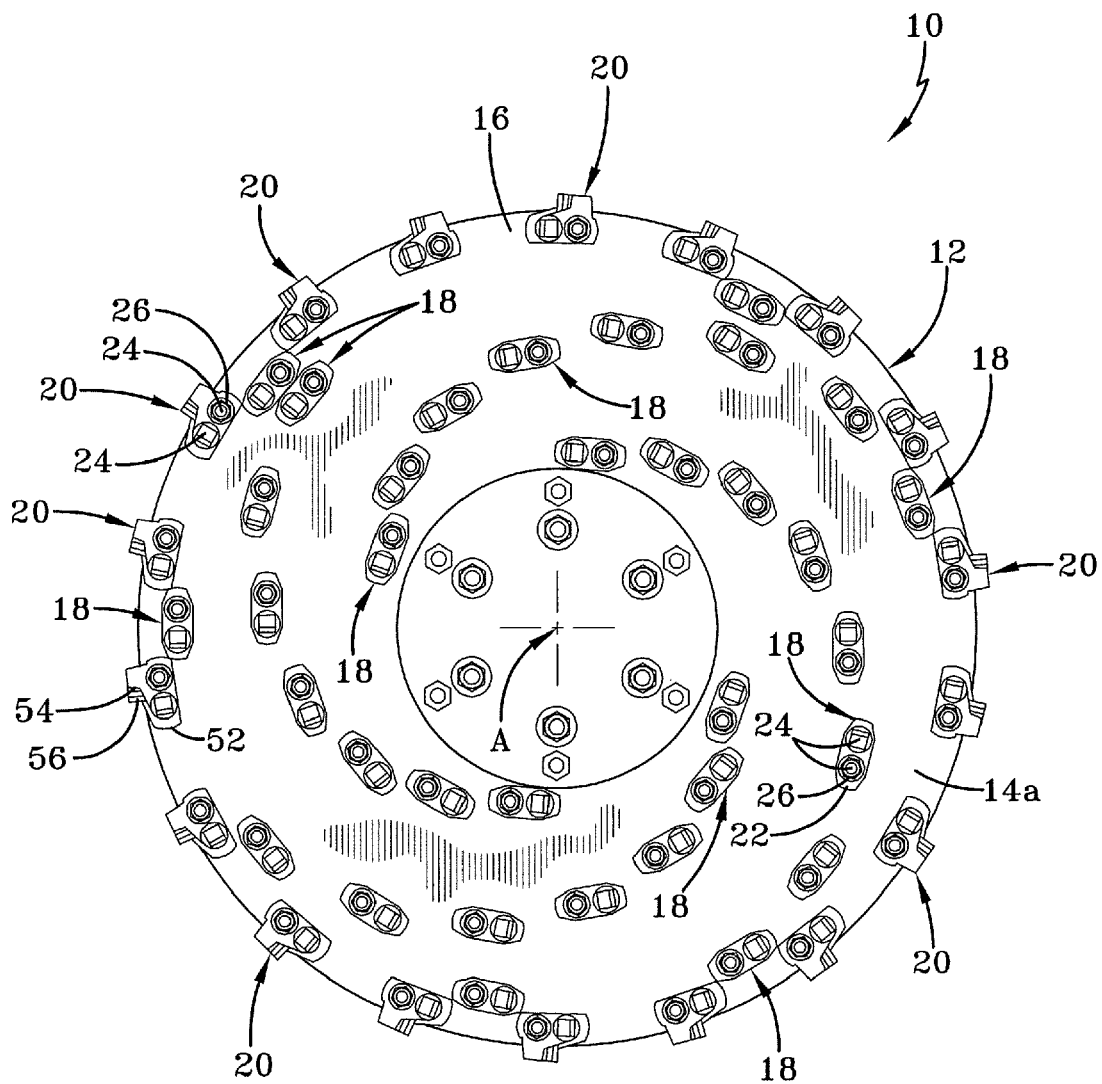
FIG. 1 is a side elevational view of a first stump grinding wheel of the prior art.

In order to better understand the stump grinding wheel of the present invention, prior art stump grinding wheels and components of the wheels are shown in FIGS. 1-6. With reference now to FIG. 1, a first prior art stump grinding wheel is indicated generally at 10 and is adapted to be bolted to a rotary drive mechanism of a stump grinding machine (not shown) for rotation about a center axis of rotation A. First prior art stump grinding wheel 10 includes a wheel disc 12. Wheel disc 12 includes a pair of opposing side surfaces 14a, 14b (FIG. 3) and a cylindrical outer peripheral surface or periphery 16, which interconnects the side surfaces. Mounted on wheel disc 12 are side cutter assemblies 18 and first prior art peripheral cutter assemblies 20.

More particularly, each side cutter assembly 18 is mounted to wheel disc 12 in a generally circumferentially-extending orientation, and the side cutter assemblies form a plurality of generally helical patterns. With additional reference to FIG. 3, each side cutter assembly 18 includes a pair of pockets 22, with each pocket being disposed on respective ones of the side surfaces 14a, 14b of wheel disc 12. Each side cutter assembly also includes a cutting tooth 24 and a nut 26. Each cutting tooth 24 passes through both of pockets 22, and each nut 26 serves to secure a respective tooth to the pockets, as well as to secure the two pockets to wheel disc 12.

Figure 4:
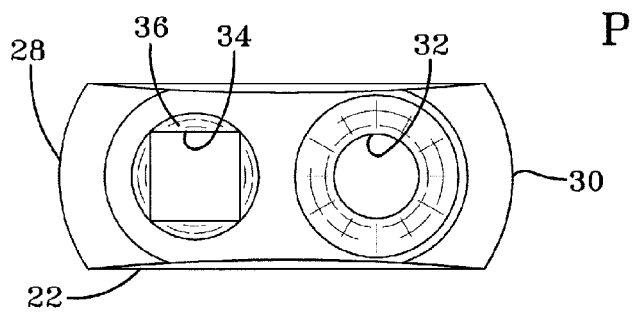
FIG. 4 is an elevational view of a prior art pocket of a side cutter assembly that is mounted on the stump grinding wheel shown in FIG. 1.

As shown in FIG. 4, pocket 22 is of elongated shape and includes beveled leading and trailing end surfaces 28 and 30, respectively. Extending through pocket 22 are first and second through-holes 32 and 34, respectively. First through-hole 32 has a circular cross section, whereas second through-hole 34 is has a square cross-section and is formed with a generally spherical recess 36.

Figure 2:
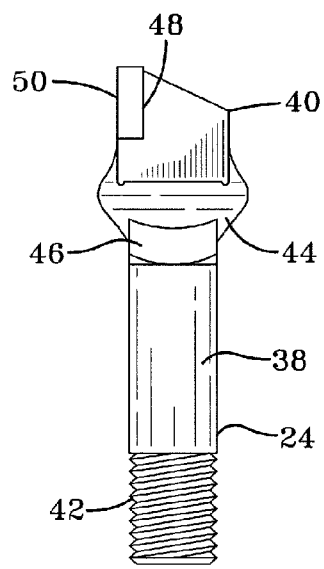
FIG. 2 is an elevational view of a cutting tooth that is mounted on the stump grinding wheel shown in FIG. 1.
Figure 3:
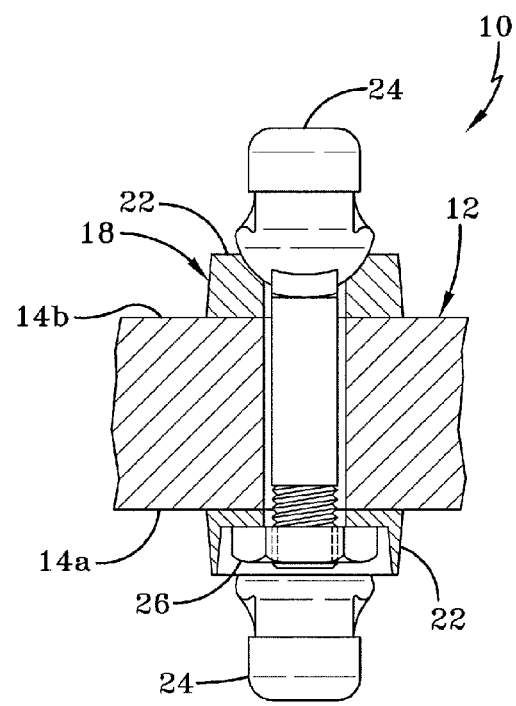
FIG. 3 is a fragmentary cross-sectional view of a portion of the stump grinding wheel shown in FIG. 1.

With reference now to FIG. 2, cutting tooth 24 includes a shank 38 of circular cross section and an enlarged head 40 disposed at one axial end of the shank. The other axial end of shank 38 is formed with an external screw thread 42 for receiving nut 26 (FIG. 3). A first portion 44 of head 40 is formed with a spherical shape corresponding to that of spherical recess 36 that surrounds second pocket through-hole 34. A second portion 46 of head 40 is formed with a square cross section, corresponding to the cross-sectional shape of pocket through-hole 34. Head 40 is formed with a seat 48 in which a cutting tip or edge 50, which is formed of a hard material such as a carbide, is mounted by brazing or other techniques known in the art.

Returning now to FIG. 1, first prior art peripheral cutter assemblies 20 are partially similar to side cutter assemblies in that each peripheral cutter assembly includes a pair of pockets 52 through which two cutting teeth 24 project and are secured by respective nuts 26. However, pockets 52 are adapted to form a seat 54, which enables an additional cutting tooth 56 to extend outwardly of wheel peripheral surface 16.

Figure 5:
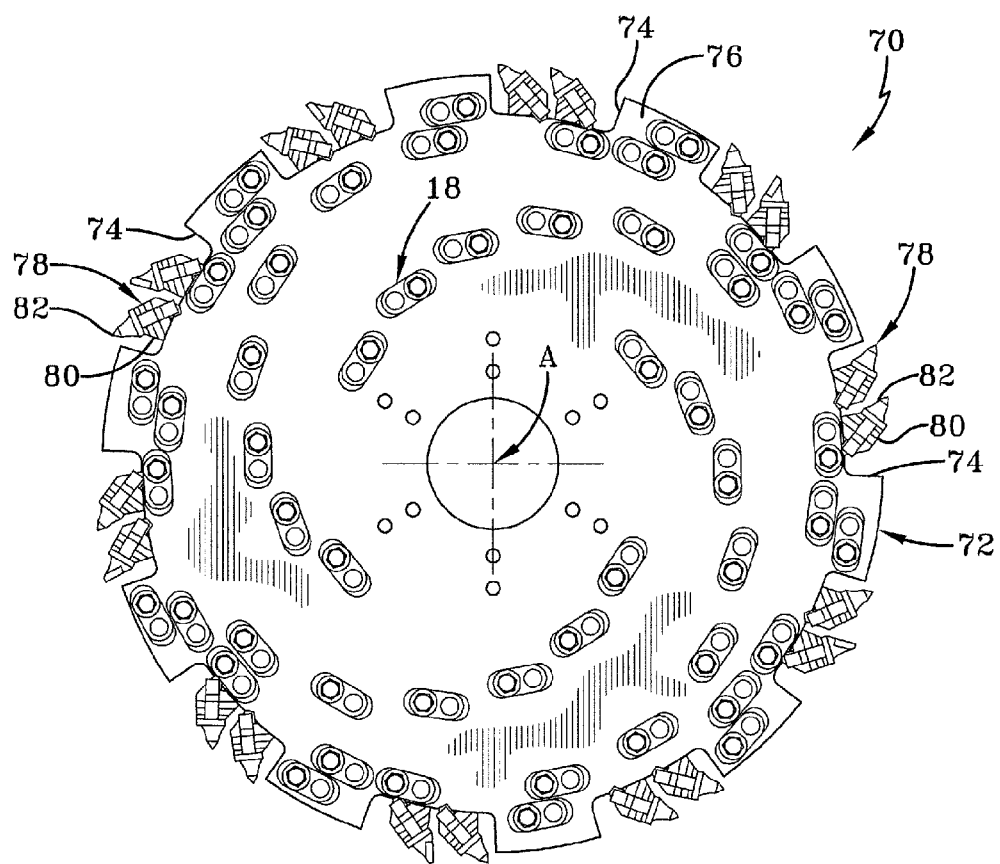
FIG. 5 is a side elevational view of a second stump grinding wheel of the prior art.

Turning now to FIG. 5, in order to improve the mounting of cutting teeth on the perimeter of the stump grinding wheel, a second prior art stump grinding wheel was developed and is indicated generally at 70. Second prior art stump grinding wheel 70 includes a wheel disc 72, which is formed with a plurality of circumferentially spaced apart recesses 74 in a peripheral edge or periphery 76 of the wheel disc. Disposed in each recess 74 and mounted to wheel disc 72 is at least one second prior art peripheral cutter assembly 78, each of which includes a block 80 and a cutting bit 82 mounted on the block. As is known to those skilled in the art, second prior art peripheral cutter assemblies 78 of second prior art stump grinding wheel 70 are improved in construction and performance over first prior art peripheral cutter assemblies 20 of first prior art stump grinding wheel 10 (FIG. 1). Second prior art grinding wheel 70 also includes side cutter assemblies 18, which are generally the same as those mounted on first prior art stump grinding wheel 10.

Figure 6:
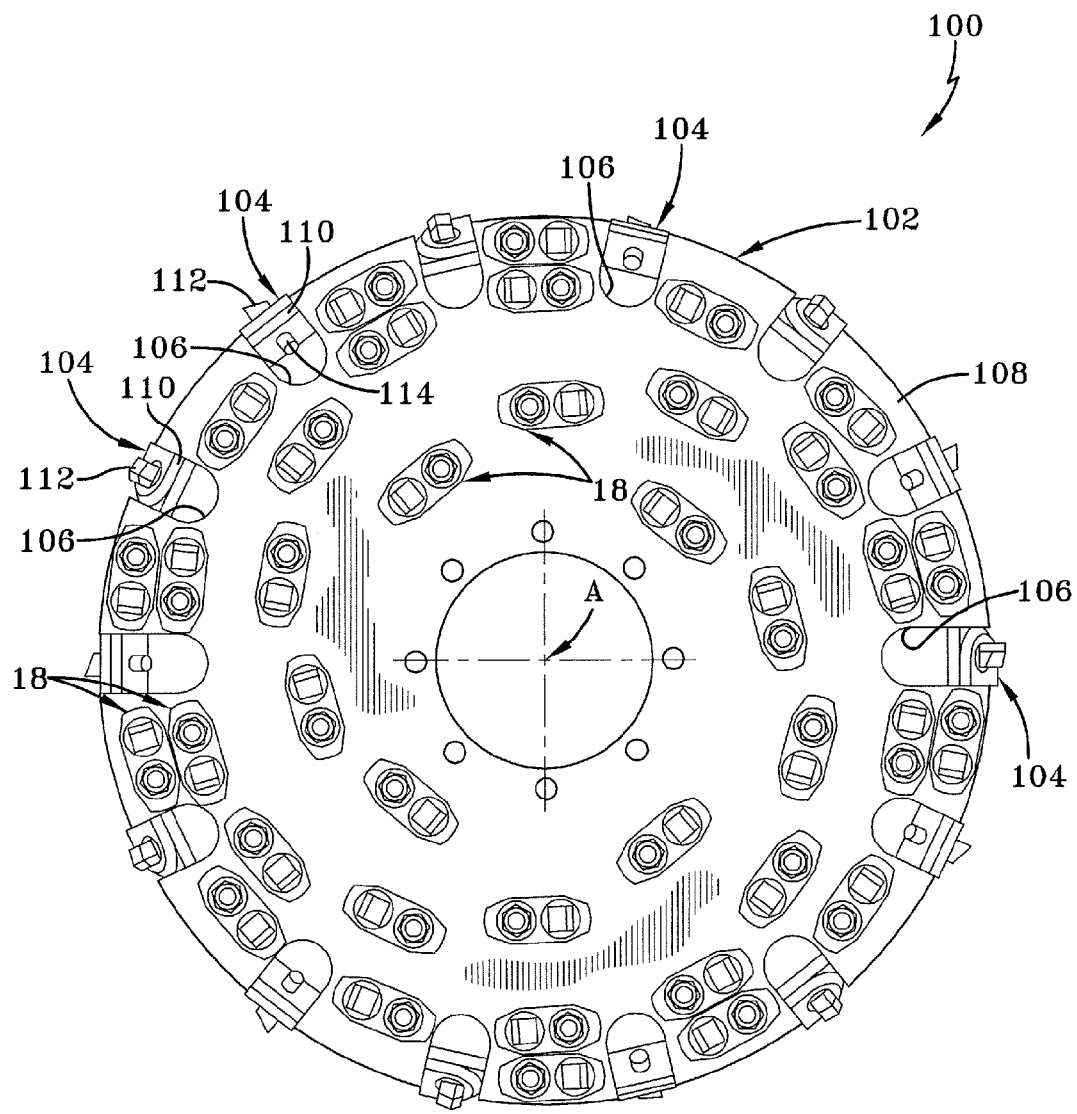
FIG. 6 is a side elevational view of a third stump grinding wheel of the prior art.

With reference now to FIG. 6, in a continuing effort to improve prior art peripheral cutter assemblies 20, 78, a third prior art stump grinding wheel was developed and is indicated generally at 100. Third prior art stump grinding wheel 100 includes a wheel disc 102 having respective slots or recesses 106 formed in a periphery 108 of the wheel disc, and a peripheral cutter assembly 104 mounted in each recess. Each peripheral cutter assembly 104 includes a holder 110 disposed in a respective one of recesses 106, a cutting tooth 112 mounted on the holder, and a nut 114 that secures the cutting tooth in the holder. Holder 110 is fixedly secured to wheel disc 102 by means known to those skilled in the art, such as by welding. Peripheral cutter assemblies 104 preferably include two different orientations of teeth 112 relative to wheel disc 102. That is, some peripheral cutter assemblies 104 include teeth that are angled toward one side of wheel disc 102, while other peripheral cutter assemblies include teeth that are angled toward the opposing side of the wheel disc, thereby optimizing the cutting efficiency of the peripheral cutter assemblies. Third prior art stump grinding wheel 100 also includes side cutter assemblies 18, which are generally the same as those mounted on first and second prior art stump grinding wheels 10, 70.

During use of prior art wheels 10, 70, 100, each respective peripheral edge or area 16, 76, 108 is subjected to extreme wear, as described above. Side cutter assemblies 18 and peripheral cutter assemblies 20, 78, 104, respectively, leave significant areas of each respective peripheral edge 16, 76, 108 unprotected and thus vulnerable to such extreme wear, which undesirably shortens the life of each prior art wheel 10, 70, 100. In addition, as best shown in FIG. 6, the mounting of prior art side cutter assemblies 18 near wheel periphery 108 in a circumferentially-oriented manner causes some of the side cutter assemblies to interfere with one another, while also interfering with the welds that secure peripheral cutter assemblies 104 to wheel disc 102. Such interference creates congested areas on prior art wheel 100 that pack with dirt and pieces of the stump, which may in turn cause the wheel to become undesirably unbalanced.

The use of generally circumferentially-oriented side cutter assemblies 18 on prior art wheels 10, 70, 100 also impedes proper or optimum alignment of cutting tips or edges 50 (FIG. 2) of respective cutting teeth 24, as described above. Such alignment issues tend to cause an undesirable difference in cutting performance when cutting edges 50 on one side of prior art wheel 10, 70, 100 contact a stump, as compared to when the cutting edges on the opposing side of the wheel contact the stump. In addition, in prior art wheels 10, 70, 100, when each tooth 24 of side cutter assembly 18 is inserted into its respective pocket 22 and tightened down with nut 26 (FIG. 3), square portion 46 of the tooth (FIG. 2) may rotate until a wall or corner of that square portion meets and seats against a corresponding wall or corner of square recess 34 formed in the pocket (FIG. 4), potentially creating further problems with the alignment of cutting edges 50.

Moreover, the use of an aggressive combination of side cutter assemblies 18 and peripheral cutter assemblies 20, 78, 104 on prior art stump grinding wheels 10, 70, 100, respectively, tends to cause the wheels to undesirably hang up or stall on smaller stump grinding machines.

As a result, there is a need in the art for a stump grinding wheel that includes side cutter assemblies having pockets which provide improved positioning, placement and orientation of the side cutter assemblies to protect the peripheral edge of the wheel and reduce congested areas that are created along the peripheral edge of the wheel, provides improved alignment of the edges of the cutting teeth, maintains such alignment when the cutting teeth are tightened down, and provides optional use of less aggressive side cutter assemblies when a smaller stump grinding wheel or machine is used. The stump grinding wheel of the present invention satisfies this need.

Turning now to the drawings of the present invention, wherein the illustrations are for showing preferred embodiments of the invention, and not for limiting the same, FIGS. 7-12 show a first exemplary embodiment of a stump grinding wheel of the present invention, indicated generally at 200, and FIGS. 13-18 show a second exemplary embodiment of a stump grinding wheel of the present invention, indicated generally at 250.

Figure 7:
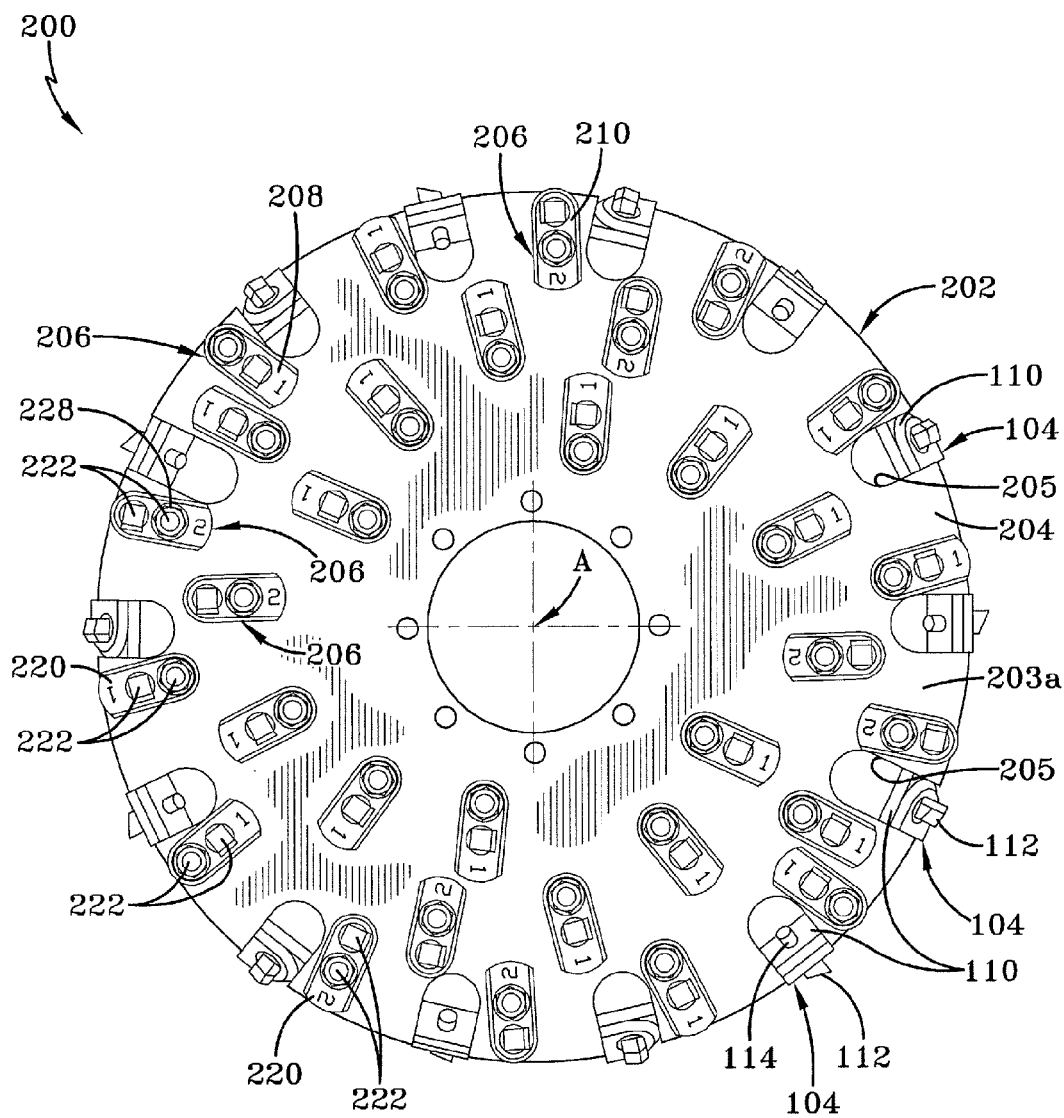
FIG. 7 is a side elevational view of a first embodiment stump grinding wheel of the present invention.

With particular reference to FIG. 7, first embodiment stump grinding wheel 200 includes a wheel disc 202 which has two opposing sides 203a and 203b (203b not shown), and a peripheral edge or periphery 204 that extends between and interconnects the sides. Slots or recesses 205 are formed in periphery 204 and sides 203a,b of wheel disc 202 near the periphery, and peripheral cutter assemblies are disposed within respective ones of the slots and mounted to the wheel disc, as will be described in greater detail below. Preferred peripheral cutting assemblies include peripheral cutting assemblies 104, which are shown in FIG. 7 and are generally the same as those used in third prior art stump grinding wheel 100 (FIG. 6).

More particularly, each peripheral cutter assembly 104 includes a holder 110 disposed in a respective one of recesses 205, a peripheral cutting tooth 112 mounted in the holder, and a nut 114 which secures the cutting tooth in the holder. Holder 110 is fixedly secured to wheel disc 202 by means known to those skilled in the art, such as by welding. Peripheral cutter assemblies 104 preferably include at least two different orientations of teeth 112 relative to wheel disc 202. For example, some peripheral cutter assemblies 104 may include teeth 112 that are angled toward first side 203a of wheel disc 202, while other peripheral cutter assemblies may include teeth that are angled toward second side 203b of the wheel disc, thereby optimizing the cutting efficiency of the peripheral cutter assemblies.

Also mounted on wheel disc 202 are first embodiment new side cutter assemblies 206, which include improved pockets 208, 210 and side cutter teeth 222, as will be described in greater detail below. More particularly, each side cutter assembly 206 is mounted to wheel disc 202 in a generally radially-extending orientation, rather than a circumferentially-extending orientation, and the side cutter assemblies form a plurality of generally helical patterns. The mounting of side cutter assemblies 206 in a radially-extending orientation takes advantage of the radial space available on wheel disc 202, thereby reducing the congestion of the side cutter assemblies relative to one another, and relative to peripheral cutter assemblies 104. With the reduced congestion enabled by radially-oriented side cutter assemblies 206, there is less opportunity for dirt to pack onto stump grinding wheel 200, thereby desirably improving the ability to keep the wheel balanced during operation.

Figure 8:
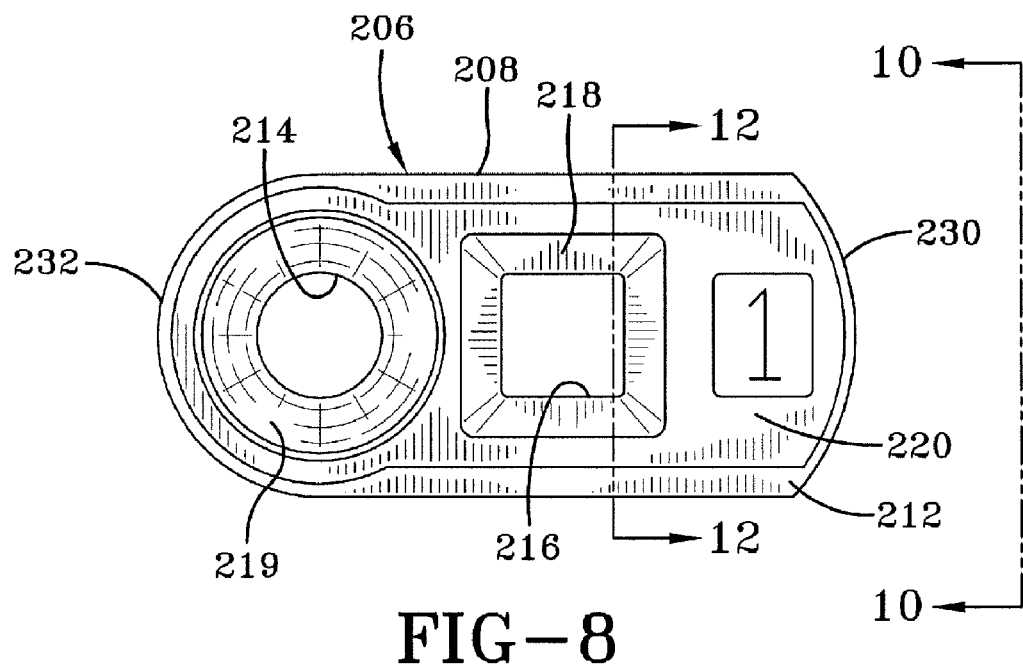
FIG. 8 is an elevational view of a first pocket of a side cutter assembly that is mounted on the stump grinding wheel shown in FIG. 7.
Figure 9:
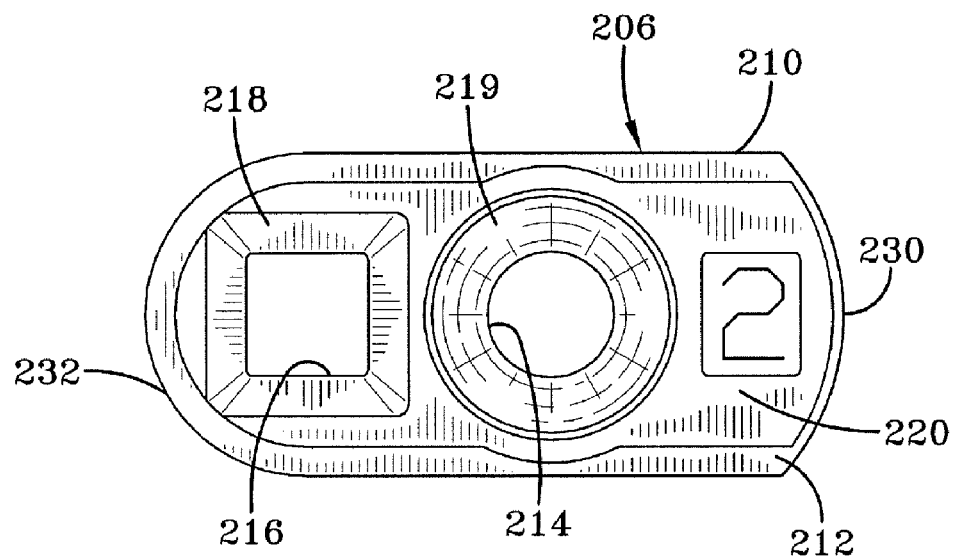
FIG. 9 is an elevational view of a second pocket of a side cutter assembly that is mounted on the stump grinding wheel shown in FIG. 7.
Figure 10:
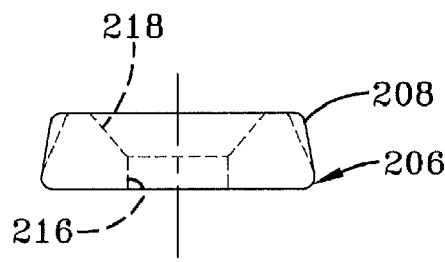
FIG. 10 is an end view of the pocket shown in FIG. 8, with hidden parts represented by dashed lines.

With additional reference now to FIGS. 8-10, each side cutter assembly 206 includes a pair of separate corresponding pockets, that is, a first pocket 208 and a second pocket 210. For each pair, first pocket 208 is disposed on one side of wheel disc 202, such as on first side 203a, and second pocket 210 is disposed on the opposing side of the wheel disc, such as on second side 203b. In this manner, pockets 208, 210 cooperate with one another as they form part of each side cutter assembly 206. As shown in FIG. 7, depending on the specific arrangement of side cutter assemblies 206, certain ones of first side pockets 208 may be disposed on wheel disc first side 203a, while corresponding second pockets 210 are disposed on wheel disc second side 203b, and certain ones of the second pockets may be disposed on the wheel disc first side, while corresponding first pockets may be disposed on the wheel disc second side.

Each pocket 208, 210 is of an elongated shape and includes a leading end 230, a trailing end 232, and a beveled edge or area 212 that extends about the periphery of the pocket. First and second openings or through-holes 214 and 216, respectively, preferably are formed in each pocket 208, 210. First through-hole 214 preferably has a circular cross section, whereas second through-hole 216 preferably has a square cross section. A generally square recess 218 preferably is formed in each pocket 208, 210 about second hole 216 to receive cutting tooth 222, and a generally round recess 219 preferably is formed in each pocket about first hole 214 to receive a nut 228. In this manner, each tooth 222 passes through first and second pockets 208, 210 and through corresponding openings formed in wheel disc sides 203a, 203b (not shown), and when each nut 228 is tightened, side cutter assembly 206 is secured to wheel disc 202.

In each pocket 208, 210, through-holes 214, 216 are located toward trailing end 232 of each respective pocket, which creates a wear pad area 220 on each pocket adjacent leading end 230. In first pocket 208, first through-hole 214 preferably is adjacent trailing end 232, while second through-hole 216 preferably is adjacent wear pad 220. In second pocket 210, second through-hole 216 preferably is adjacent trailing end 232, while first through-hole 214 preferably is adjacent wear pad 220. This configuration enables pockets 208, 210 to be installed in a cooperative manner on each side 203a, 203b of wheel disc 202.

Wear pad 220 on each pocket 208, 210 is a generally smooth surface that is able to protect wheel disc 202 from extreme wear, particularly when combined with the radially-extending mounting orientation of side cutter assemblies 206. For example, as shown in FIG. 7, selected ones of side cutter assemblies 206 are able to be mounted on wheel disc 202 with wear pads 220 of pockets 208, 210 extending outwardly to, and even past, wheel periphery 204. Thus, the use of smooth wear pads 220 on radially-extending pockets 208, 210, enables the wear pads to provide increased coverage on wheel periphery 204, thereby reducing the amount of wear that is imposed on the periphery without additional components or cost.

Figure 11:
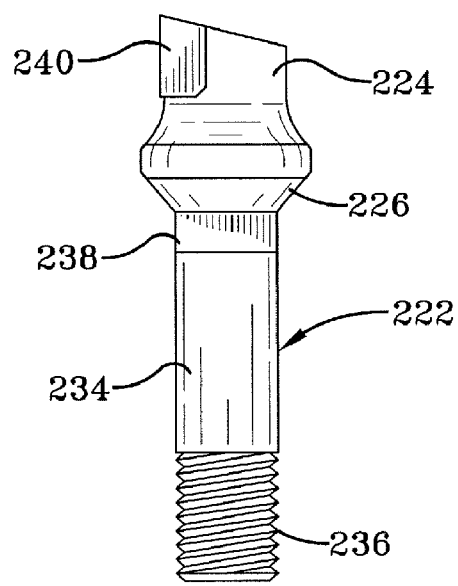
FIG. 11 is an elevational view of a cutting tooth of a side cutter assembly that is mounted on the stump grinding wheel shown in FIG. 7.
Figure 12:
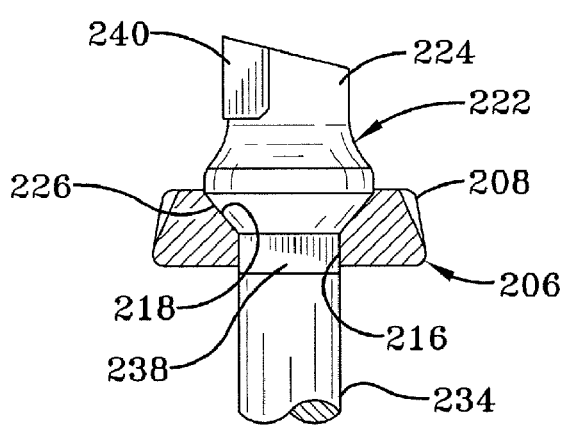
FIG. 12 is a fragmentary view of the tooth shown in FIG. 11 seated in a cross-sectional view of the pocket that is shown in FIG. 8, taken along line 12-12.

Turning now to FIG. 11, cutting tooth 222 of side cutter assembly 206 includes a shank 234 with an enlarged head 224 at one end of the shank, and a threaded portion 236 at the other end of the shank for receiving nut 228 (FIG. 7). Head 224 of cutting tooth 222 is formed with a square-tapered portion 226 corresponding to that of recess 218 formed in pocket 208, as shown in FIG. 12. Shank 234 also includes a portion 238 adjacent square-tapered portion 226 which has a square cross section corresponding to that of second through-hole 216 in each pocket 208, 210. Threaded portion 236 of shank 234 has a round cross section corresponding to first through-hole 214 in each pocket 208, 210 (FIGS. 8 and 9). A cutting tip or edge 240, which preferably is formed of a hard material such as a carbide, is mounted on head 224 via brazing or other techniques that are known in the art.

With reference to FIGS. 13-18, second embodiment stump grinding wheel 250 of the present invention is similar to first embodiment stump grinding wheel 200, and provides an additional advantage. More particularly, as described above, first embodiment stump grinding wheel 200 includes side cutter assemblies 206 that each include pairs of separate first and second pockets 208, 210. With the use of two separate pockets 208, 210, it may be possible for a user to potentially re-install the pockets after removal for maintenance in a less-than-optimal manner. For example, a user may inadvertently re-install first pocket 208 in a position that was designed for second pocket 210, or vice-versa, which could result in a pattern of side cutter assemblies that reduces the cutting performance of stump grinding wheel 200 from the pattern as designed by the manufacturer.

As a result, second embodiment stump grinding wheel 250 of the present invention provides a means for re-installing the pockets of the side cutter assemblies on the wheel in a manner that maintains the optimum cutting pattern designed by the manufacturer. As second embodiment stump grinding wheel 250 is essentially the same in design and construction as first embodiment stump grinding wheel 200, only the differences between the second embodiment stump grinding wheel and the first embodiment stump grinding wheel will now be described.

Figure 13:
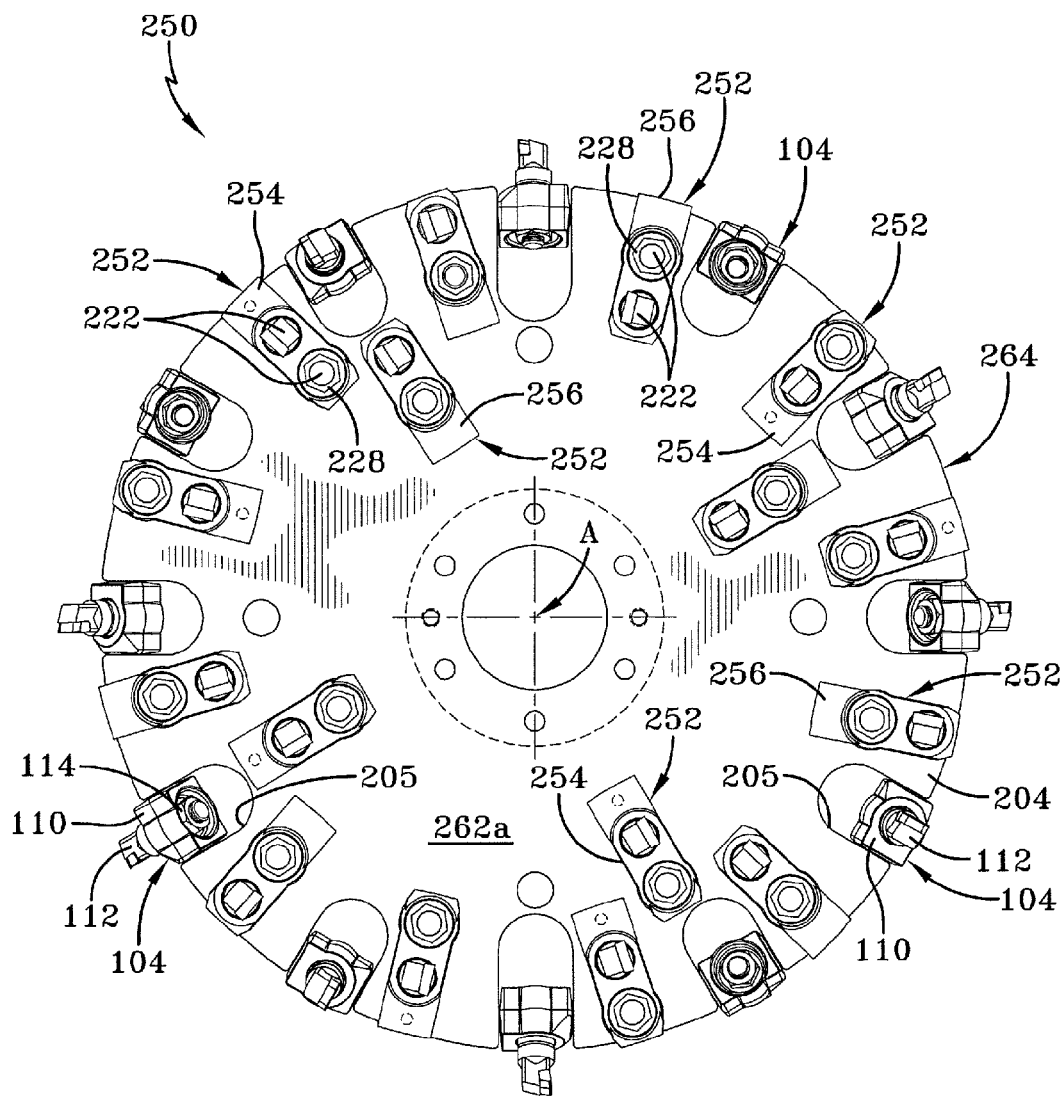
FIG. 13 is a side elevational view of a second embodiment stump grinding wheel of the present invention.
Figure 14:
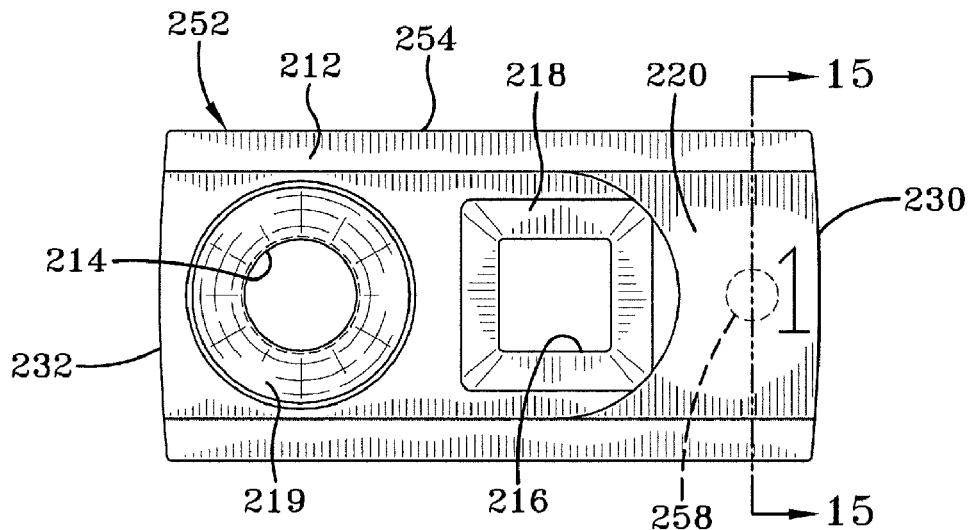
FIG. 14 is an elevational view of a first pocket of a side cutter assembly that is mounted on the stump grinding wheel shown in FIG. 13.
Figure 15:
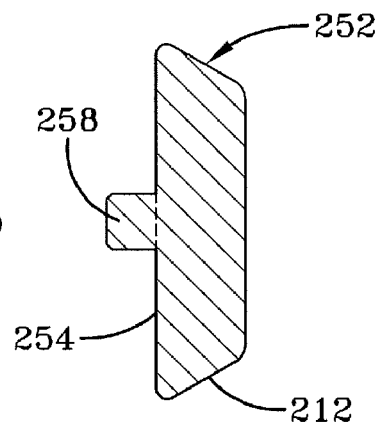
FIG. 15 is a cross-sectional view of the pocket shown in FIG. 14 taken along line 15-15.
Figure 16:
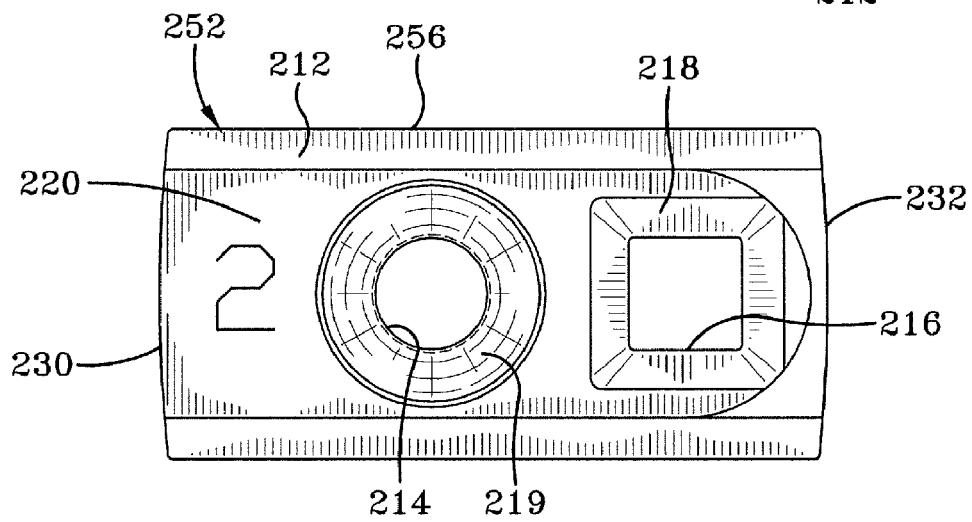
FIG. 16 is an elevational view of a second pocket of a side cutter assembly that is mounted on the stump grinding wheel shown in FIG. 14.
Figure 17:
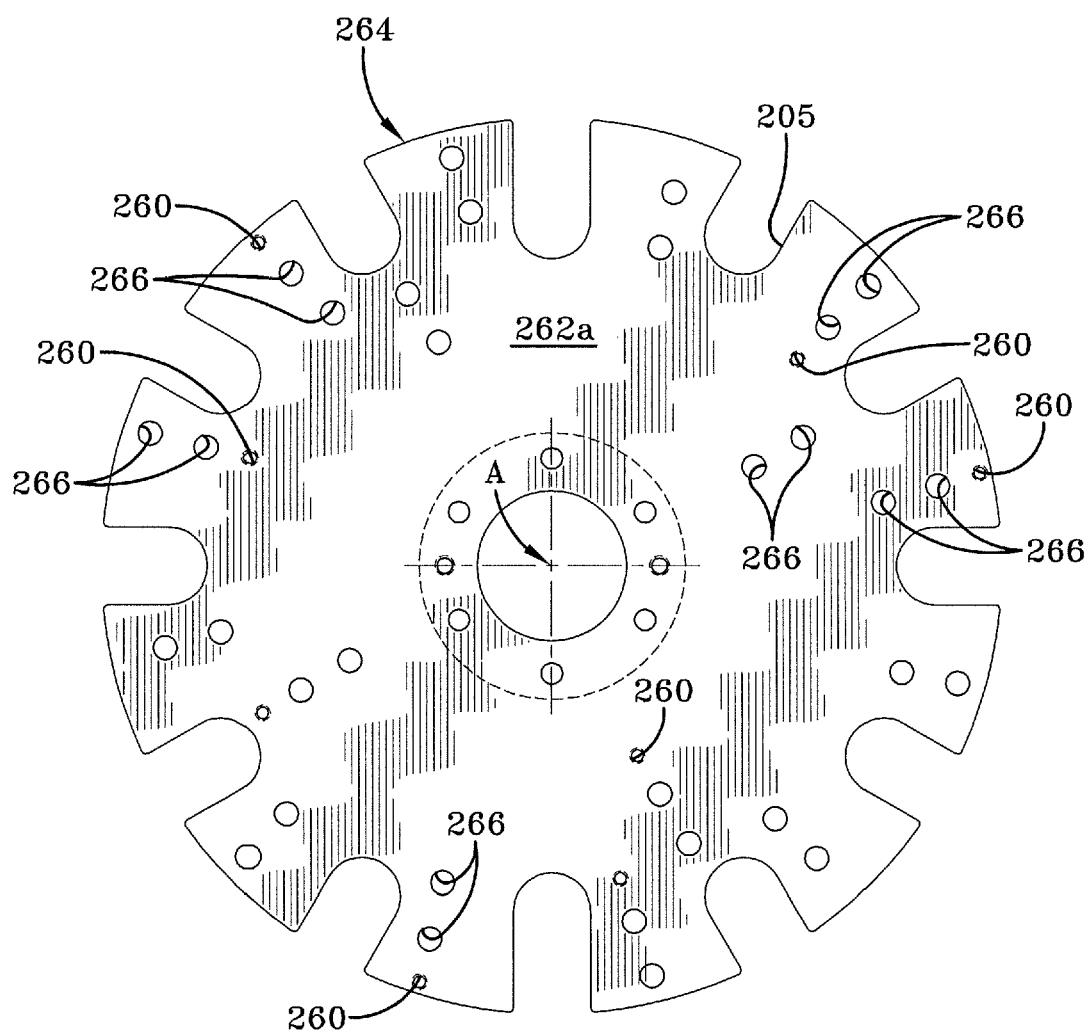
FIG. 17 is a side elevational view of a first side of the wheel disc of the stump grinding wheel shown in FIG. 13.
Figure 18:
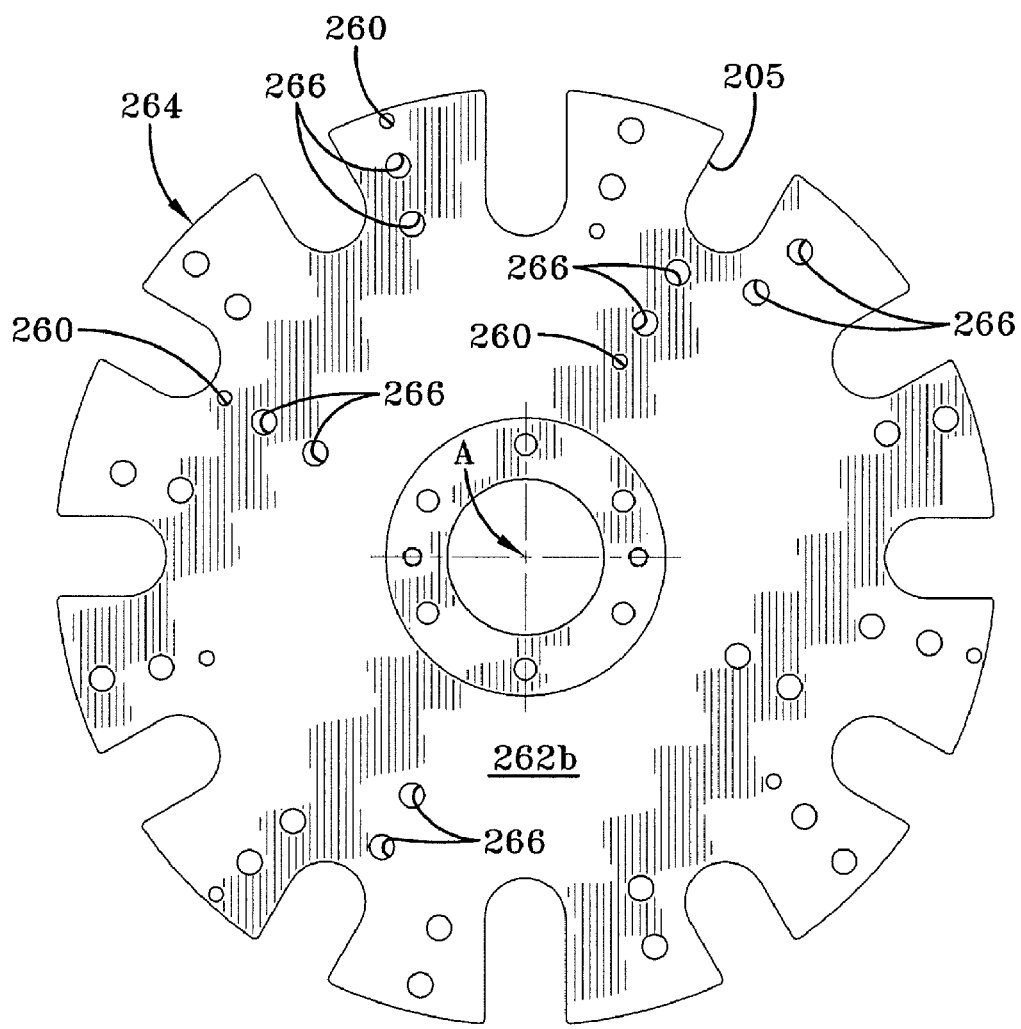
FIG. 18 is a side elevational view of the second side of the wheel disc of the stump grinding wheel shown in FIG. 13.

Turning to FIG. 13, second embodiment stump grinding wheel includes side cutter assemblies 252, and each side cutter assembly in turn includes a pair of separate corresponding pockets, that is, a first pocket 254 and a second pocket 256. With additional reference to FIGS. 14-16, one of first pocket 254 and second pocket 256, for example, the first pocket, includes a locating pin 258. As shown in FIGS. 17 and 18, each locating pin 258 is received by a corresponding locating pin opening or recess 260 formed in sides 262a and 262b of a wheel disc 264 of second embodiment stump grinding wheel 250. Wheel disc sides 262a and 262b are also formed with openings 266 for receiving teeth 222 in a manner similar to that as described above for first embodiment stump grinding wheel 200. Openings 260 for locating pins 258 do not pass completely through wheel disc 264, thereby ensuring that each first pocket 254, which has the locating pin, may only be installed in predetermined locations on each wheel disc side 262a, 262b. In this manner, openings 260 for locating pins 258 are formed in a pattern in wheel disc sides 262a and 262b which cooperates with openings 266 formed for teeth 222 to assure proper re-installation of first and second pockets 254, 256 in the original pattern and orientation set by the manufacturer.

It is to be understood that the pattern of side cutter assemblies 206, 252 may vary depending upon specific design considerations. For example, one pattern of side cutter assemblies 206 is shown in FIG. 7 as mounted on first embodiment stump grinding wheel 200, and another pattern of side cutter assemblies 252 is shown in FIG. 13 as mounted on second embodiment stump grinding wheel 250.

First and second embodiments stump grinding wheel 200, 250 thus provide smooth wear pads 220 on radially-extending pockets 208, 210, 254, 256, which in turn provide an increased coverage of wheel periphery 204 that is not possible with prior art pockets 22 (FIG. 4). More particularly, since each prior art pocket 22 includes a symmetrical configuration with holes 32, 34 being generally equidistant from the center of the pocket, the holes are located near pocket edges 28, 30. Such a location of holes 32, 34 near pocket edges 28, 30 in the prior art prevents the formation of a surface area that is able to serve as a wear pad, which in turn prevents prior art pockets 22 from being effectively placed near wheel periphery 204, in contrast to the advantageous manner that is enabled by pockets 208, 210, 254, 256 of the stump grinding wheel 200, 250 of the present invention.

The placement of pockets 208, 210, 254, 256 with wear pads 220 up to and even past wheel periphery 204, as enabled by stump grinding wheel 200, 250 of the present invention, includes other advantages. For example, additional openings or holes can be formed in wheel disc 202, 264 to enable variable placement of pockets 208, 210, 254, 256 so that an operator can adjust the radial extension of the pockets relative to wheel periphery 204, thus limiting and/or controlling the depth of the cut of teeth 112 of peripheral cutter assemblies 104. Also, radial orientation of each side cutter assembly 206, 252 with wear pad 220 at wheel periphery 204 enables pockets 208, 210, 254, 256 to be located adjacent each peripheral cutter assembly 104, thereby acting as rakers to protect peripheral pockets 110 and the welds that secure the pockets to wheel disc 202, 264 from excessive wear, while maintaining a desirable helical pattern of side-cutting teeth 222.

The mounting of side cutter assemblies 206, 252 in a radially-extending orientation enables improved alignment of cutting edges 240 of teeth 222 of the side cutter assemblies. More particularly, the prior art circumferential orientation of side cutter assemblies 18 on wheels 10, 70, 100 creates angles between cutting edges 50 of prior art teeth 24. These angles cause cutting edges 50 on one side of prior art wheels 10, 70, 100 to be properly and generally uniformly aligned with a line that extends radially from the center of each respective wheel disc 12, 102, 202 to each periphery 16, 108, 204 so that the cutting edges are effective. However, cutting edges 50 on the other side of each respective wheel 10, 70, 100 are not aligned with this radial line, and thus are not effective. The radial orientation of pockets 208, 210, 254, 256 of side cutter assemblies 206, 252 of stump grinding wheel 200, 250 of the present invention provides an orientation that enables adjustment of the angle and alignment of the pockets. Such adjustment in turn enables proper and generally uniform alignment of cutting edges 240 of teeth 222 with the radial line on both sides 203a, 203b of stump grinding wheel 200, 250, which provides smooth cutting when the cutting edges on either side of the wheel are used.

Side cutter assemblies 206, 252 of stump grinding wheel 200, 250 of the present invention also enable improved alignment of cutting edges 240 of teeth 222 as the teeth are tightened. More particularly, as described above, the design of prior art side cutter assemblies 20 enabled teeth 24 to rotate upon tightening, often up to about seven degrees from the desired alignment position, thereby contributing to misalignment of cutting edges 50. In contrast, pockets 208, 210, 254, 256 of each side cutter assembly 206, 252 are formed with square recess 218 about square hole 216, and tooth 222 is formed with a corresponding square taper 226. Thus, when tooth 222 is tightened down in hole 216, square taper 226 on the tooth seats in square recess 218, and the tooth slides into the hole without significant turning or rotation. In this manner, tooth 222 remains centered and aligned as it is tightened, thereby maintaining the alignment of cutting edge 240.

It is to be noted that pockets 208, 210, 254, 256 may be formed as discrete units from wheel disc 202, 264 of stump grinding wheel 200, 250 of the present invention, or they may be integrally formed on the wheel disc. That is, holes 214, 216, and corresponding recesses 218, 219 may be formed in wheel disc 202, 264 whereupon tooth 222 is secured directly to the wheel disc. Moreover, pockets 208, 210, 254, 256 may be of different sizes to accommodate more than two teeth 222, without affecting the overall concept or operation of the invention.

In addition, in stump grinding wheel 200, 250 of the present invention, features of the above-described design of teeth 222 of side-cutter assemblies 206, 252 may optionally be applied to teeth 112 of peripheral cutter assemblies 104. For example, cutting tooth 112 of peripheral cutter assembly 104 may be formed with a square taper that is similar to square taper 226 formed on tooth 222 of side-cutter assembly 206, 252. Holder 110 of peripheral cutter assembly 104 would then be formed with a square recess similar to square recess 218 about square hole 216 of side-cutter assembly 206, 252. Such construction for peripheral cutter assembly 104 would enable the alignment of peripheral cutting teeth 112 to be maintained as the teeth are tightened.

Furthermore, holder 110 of peripheral cutter assembly 104 may be formed as a discrete unit from wheel disc 202, 264, as described above, or the holder may optionally be integrally formed on the wheel disc. That is, rather than wheel disc 202, 264 being formed with recess 205 and holder 110 being disposed in the recess and welded to the disc, a recess may instead be formed in the wheel disc that is of a suitable size and shape to enable tooth peripheral cutting tooth 112 to be secured directly to the wheel disc. In such a design, tooth 112 may be formed with a square taper, and the recess would be formed in wheel disc 202, 264 with a corresponding shape to maintain the alignment of the cutting tooth as it is tightened. In this manner, such features and advantages described herein for side-cutter assemblies 206, 252 may also be applied to peripheral cutter assemblies 104 of stump grinding wheel 200, 250 of the present invention.

Stump grinding wheel 200, 250 of the present invention also provides an option to reduce the aggressiveness of side cutter assemblies 206, 252 for smaller stump cutting or grinding machines. That is, conventional flat-top nut 228 is replaced by an acorn or raker nut (not shown). The acorn or raker nut is a rounded nut that is higher than prior art flat-top nut 26 (FIG. 3). Such a round-topped raker nut reduces the distance from the top of the nut to cutting edge 240 of a corresponding side cutter tooth 222, thereby limiting the depth of the cut into the stump by the cutting tip of the side cutter tooth. In addition, the rounded top of a raker nut is smoother and therefore less aggressive than prior art flat-top nut 26. These characteristics lead to a less aggressive cut by side cutter assemblies 206, 252 of stump grinding wheel 200, 250 of the present invention, which in turn requires less power to rotate the wheel, and thus is better for smaller stump grinding machines.

In this manner, stump grinding wheel of the present invention 200, 250 provides side cutter assemblies 206, 252 with pockets 208, 210, 254, 256 that have integrated wear pads 220, which reduce or prevent wear about wheel periphery 204, and protect from wear pockets 110 of peripheral cutter assemblies 104 and the welds that secure the pockets to the wheel, while maintaining a helical cutting pattern and orientation of side cutter teeth 222 for optimum cutting performance. In addition, the arrangement of side cutter assemblies 206, 252 in a radial orientation limits interference of the side cutter assemblies with one another and with the welds of peripheral cutter assemblies 104, thereby reducing the possibility of clogging wheel 200, 250 with roots and dirt.

The mounting of side cutter assemblies 206, 252 in a radial orientation also ensures that cutting edges 240 of side cutter teeth 222 are generally at equal angles on each side of wheel 200, 250 for smooth cutting with the edges on either side of the wheel. The use of square-tapered recess 218 in pocket 208, 210, 254, 256 and a corresponding taper 226 on tooth 222 of stump grinding wheel 200, 250 of the present invention enables the alignment of cutting edges 240 to be maintained when the teeth are tightened.

Furthermore, the use of wear pads 220 on pockets 208, 210, 254, 256 of side cutter assemblies 206, 252 and the radial orientation of the side cutter assemblies enable holes 214, 216 of the pockets to align with different sets of holes that may be formed in wheel disc 202, 264. Such optional adjustability of side cutter assemblies enables wear pads 220 to extend to various heights above wheel periphery 204, thereby enabling an operator to gauge the depth of cut for peripheral cutting teeth 112. The radial orientation of side cutter assemblies 206, 252 of stump grinding wheel 200, 250 of the present invention also enables a manufacturer to adjust the angle of the side cutter assemblies to achieve a more forward angle of the cutter assemblies, known to those skilled in the art as a positive rake, to allow the side cutter assemblies to cut more aggressively using larger stump grinding machines, or to achieve a more backward angle, known to those skilled in the art as a negative rake, to allow the side cutter assemblies to cut less aggressively using smaller stump grinding machines.

Moreover, the optional use of raker nuts of selected heights to secure side cutter teeth 222 enables control of the depth of the cut of side cutter assemblies 206, 252.

Accordingly, the improved stump grinding wheel of the present invention is simplified, provides an effective, safe, inexpensive, and efficient structure which achieves all the enumerated objectives, provides for eliminating difficulties encountered with prior art stump grinding wheels, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the stump grinding wheel is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A stump grinding wheel, comprising:
    a wheel disc including a first side, a second side opposing said first side, and an outer periphery extending between and interconnecting said sides;
    a plurality of recesses formed in said wheel disc periphery;
    a peripheral cutter assembly disposed in each one of said recesses and mounted on said wheel disc; and
    a plurality of side cutter assemblies mounted on said wheel disc, each one of said side cutter assemblies including:
        a first pocket and a second pocket, said first pocket being disposed on one of said first and second sides of said wheel disc and said second pocket being disposed on the other of the first and second sides of the wheel disc, each one of said pockets including a leading end and a trailing end and being formed with a pair of openings, said pair of openings being offset toward said trailing end from said leading end;
        a first opening of said pair of openings including a cross section that is different from a cross section of a second opening of the pair of openings;
        said first opening being disposed adjacent said trailing end of said first pocket, and said second opening being disposed adjacent said trailing end of said second pocket;
        a cutting tooth received in a selected one of said pair of openings formed in said first pocket, an opening formed in said wheel disc, and a selected one of said pair of openings formed in said second pocket; and
        a nut threadably engaging said cutting tooth, whereby upon tightening of said nut, said tooth is secured to said first and second pockets, and said pockets are secured to said wheel disc.

2. The stump grinding wheel of claim 1, wherein said pockets are radially oriented relative to said wheel disc.

3. The stump grinding wheel of claim 1, wherein the position of each one of said pockets on said wheel disc is radially adjustable relative to the wheel disc.

4. The stump grinding wheel of claim 3, wherein said wear pads of said pockets extend past said periphery of said wheel disc.

5. The stump grinding wheel of claim 1, wherein:
    said wheel disc is formed with at least two openings, each one of said wheel disc openings being in alignment with a respective one of said first and second openings formed in said first pocket and being in alignment with a respective one of said first and second openings formed in said second pocket; and
    a second cutting tooth, wherein each one of said cutting teeth is received in a respective one of said first and second openings formed in said first pocket, a respective one of said aligned wheel disc openings, and a respective one of said aligned first and second openings formed in said second pocket.

6. The stump grinding wheel of claim 1, wherein said cross section of one of said first and second openings is square, each one of said pockets further being formed with a square recess about said square opening, and said tooth includes a square taper corresponding to said square recess.

7. The stump grinding wheel of claim 1, wherein said tooth includes a first portion having a cross sectional shape that corresponds to said cross section of said first opening and a second portion having a cross sectional shape that corresponds to said cross section of said second opening.

8. The stump grinding wheel of claim 1, wherein one of said first pocket and said second pocket is formed with a feature that mates with a corresponding feature formed on said wheel disc.

9. The stump grinding wheel of claim 8, wherein said feature formed on said pocket is a pin, and said corresponding feature formed on said wheel disc is an opening.

10. The stump grinding wheel of claim 1, wherein the angle of said tooth is adjustable.

11. The stump grinding wheel of claim 1, wherein said nut is a raker nut.

12. The stump grinding wheel of claim 1, wherein said pockets are integrated into said wheel disc and said tooth mounts directly on the wheel disc.

13. The stump grinding wheel of claim 1, wherein said peripheral cutter assembly is integrated into said wheel disc, and a tooth of the peripheral cutting assembly mounts directly on the wheel disc.

14. The stump grinding wheel of claim 1, wherein said cross section of one of said first and second openings is circular, and said tooth includes a round portion corresponding to said circular opening.

15. A stump grinding wheel, comprising:
    a wheel disc including a first side, a second side opposing said first side, and an outer periphery extending between and interconnecting said sides;
    a plurality of recesses formed in said wheel disc periphery;
    a peripheral cutter assembly disposed in each one of said recesses and mounted on said wheel disc; and
    a plurality of side cutter assemblies mounted on said wheel disc, each one of said side cutter assemblies including:
        a first pocket and a second pocket, said first pocket being disposed on one of said first and second sides of said wheel disc and said second pocket being disposed on the other of the first and second sides of the wheel disc, each one of said pockets being formed with a wear pad adjacent a selected end of the pocket, wherein the position of each one of said pockets on said wheel disc is radially adjustable relative to the wheel disc so that said wear pads of said pockets extend past said periphery of said wheel disc;

a cutting tooth received in aligned openings formed in said first pocket, said wheel disc, and said second pocket; and a nut threadably engaging said cutting tooth, whereby upon tightening of said nut, said tooth is secured to said first and second pockets, and said pockets are secured to said wheel disc.

16. A stump grinding wheel, comprising:

a wheel disc including a first side, a second side opposing said first side, and an outer periphery extending between and interconnecting said sides;

a plurality of recesses formed in said wheel disc periphery;

a peripheral cutter assembly disposed in each one of said recesses and mounted on said wheel disc; and a plurality of side cutter assemblies mounted on said wheel disc, each one of said side cutter assemblies including:

a first pocket and a second pocket, said first pocket being disposed on one of said first and second sides of said wheel disc and said second pocket being disposed on the other of the first and second sides of the wheel disc, each one of said pockets being formed with a wear pad adjacent a selected end of the pocket, wherein one of said first pocket and said second pocket is formed with a pin that mates with a corresponding opening formed in said wheel disc;

a cutting tooth received in aligned openings formed in said first pocket, said wheel disc, and said second pocket; and a nut threadably engaging said cutting tooth, whereby upon tightening of said nut, said tooth is secured to said first and second pockets, and said pockets are secured to said wheel disc.

* * * * *